(12) United States Patent
Choi

(10) Patent No.: US 8,402,884 B2
(45) Date of Patent: Mar. 26, 2013

(54) ANTI-BURN/ANTI-JAM ELECTRIC TOASTER WITH ELECTROMAGNETIC LATCH

(75) Inventor: Hon Man Choi, Kowloon (HK)

(73) Assignee: Hon Way Plastic & Metal Mfg. Co. Ltd., Kowloon (HK)

( * ) Notice: Subject to any disclaimer, the term of this patent is extended or adjusted under 35 U.S.C. 154(b) by 317 days.

(21) Appl. No.: 12/910,225

(22) Filed: Oct. 22, 2010

(65) Prior Publication Data

US 2012/0097044 A1    Apr. 26, 2012

(51) Int. Cl.
*A47J 37/08* (2006.01)

(52) U.S. Cl. ............ 99/332; 99/327; 219/414; 219/385; 219/386

(58) Field of Classification Search .................. 219/386, 219/392, 412–414; 99/327, 332, 337
See application file for complete search history.

(56) References Cited

U.S. PATENT DOCUMENTS

| | | | | |
|---|---|---|---|---|
| 2,193,972 A | * | 3/1940 | Lavenburg | 99/327 |
| 3,956,978 A | * | 5/1976 | Borley | 99/329 R |
| 4,170,932 A | * | 10/1979 | Lalancette | 99/326 |
| 4,395,621 A | * | 7/1983 | Parker | 219/492 |
| 4,755,656 A | * | 7/1988 | Charlesworth et al. | 219/492 |
| 5,044,263 A | * | 9/1991 | Birkert et al. | 99/327 |
| 5,094,154 A | * | 3/1992 | Nopanen | 99/328 |
| 6,753,510 B2 | * | 6/2004 | Lile et al. | 219/492 |
| 7,467,583 B2 | * | 12/2008 | Lam | 99/327 |
| 2003/0213791 A1 | * | 11/2003 | Guyett et al. | 219/386 |

FOREIGN PATENT DOCUMENTS

CN        201384407 Y        1/2010

* cited by examiner

*Primary Examiner* — Henry Yuen
*Assistant Examiner* — Jianying Atkisson
(74) *Attorney, Agent, or Firm* — Leydig, Voit & Mayer, Ltd.

(57) ABSTRACT

In a toaster, a toasting carriage is latched during toasting by an electromagnet actuated by a timer control circuit, and released when toasting time has elapsed. One of two rectifying circuits is always live and supplies a DC current to the timer control circuit and another, separate rectifying circuit supplies a DC current to energise the electromagnet when the toasting cycle is initiated. A first switching module switches a current flow through the heating element, while a second switching module isolates the always live rectifying circuit from the heating element. Switches of the first and second switching modules are disposed in an array and are closed by movement of the toasting carriage to the toasting position. More responsive and stable electromagnetic latching contributes to reducing risks associated with a fire that could occur during use of the toaster.

13 Claims, 4 Drawing Sheets

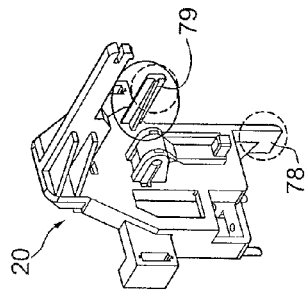
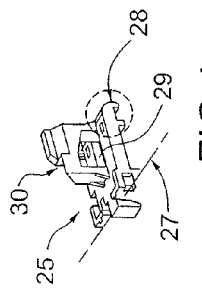
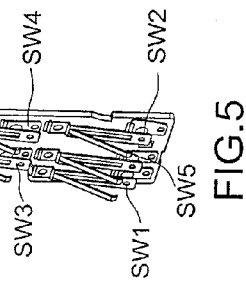
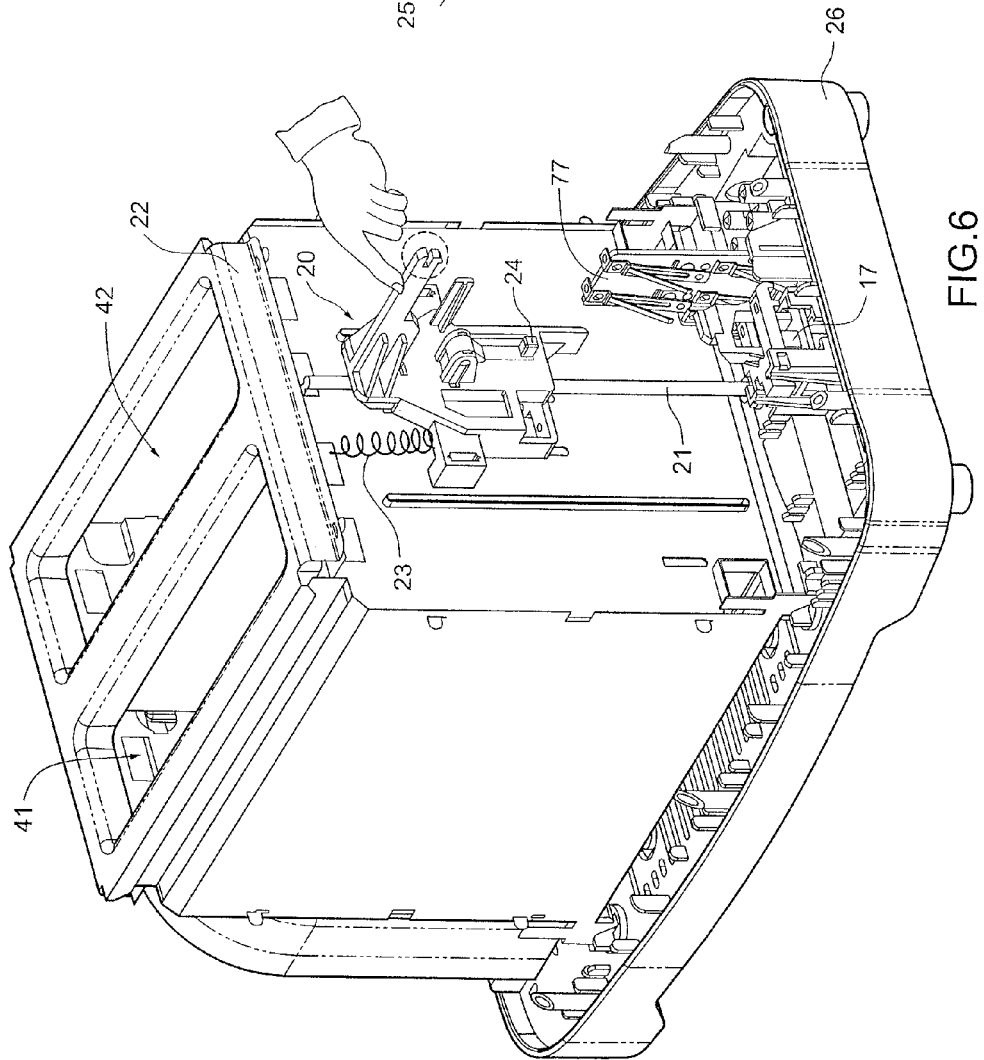

ANTI-BURN/ANTI-JAM ELECTRIC TOASTER WITH ELECTROMAGNETIC LATCH

TECHNICAL FIELD

The present invention relates to an electrically heated toaster with a toasting carriage moveable between an extended ejection position and a toasting position in which it is latched during toasting by an electromagnet actuated by a timer circuit. In particular, it relates to toasters of this type having features to avoid burning of items being toasted.

BACKGROUND OF THE INVENTION

So-called "pop-up" toasters incorporate a toasting chamber with a toasting carriage which can be lowered against a biasing spring for a toasting cycle. A handle is provided for moving the carriage to the toasting position. At the same time as being lowered the toasting carriage makes switch contacts for energising toaster elements and to begin the toasting cycle. The coil of the electromagnet is supplied with current during the toasting operation in order to hold the toasting carriage in a lowered position. At the end of the toasting operation, the supply of current to the electromagnet is stopped, and the toasting carriage rises to "pop-up" the toasted item under the action of the spring.

A prior art toaster of this type has a power circuit that supplies the heating elements with AC power and is operated by a power switch actuated by movement of the toast carriage to the toasting position. Separate from the power circuit, a control circuit to adjust toasting time includes an integrated circuit (IC). Adjustment is accomplished by varying a time constant by means of a manually variable resistor and dependent upon other mode buttons selected by the user (e.g. a "reheat mode" for reduced heating time or a "bagel mode" for extended heating). To improve the reliability of the electromagnet holding action in toasters of this type the applicant designed a toaster described in its Chinese Patent No. 200920003318.X with two DC power supply circuits fed from the mains power. The first DC supply circuit includes a first rectifier connected by a tapping at an intermediate position along the heating element, and includes switches operable for supplying current to operate the electromagnet, and the electromagnet is thus only operable when the heating elements are switched on. The second DC supply circuit supplies current to the control circuit. This second DC supply includes a second rectifier connected to the AC power terminals, such that the control circuit is always live (i.e. has electric potential to electrical ground or neutral) whenever the toaster is plugged into the mains. In the presence of a latching signal from the controller, power supply to the latching electromagnet is maintained. To provide this control signal but isolate the live second DC supply circuit from the heating elements, an optical coupler was used. Although this prior art toaster operates satisfactorily, there is an ongoing need for performance improvements in toasters of this type.

Products containing sugars and fats can, in some situations, catch fire when being toasted. With toasters of the above-described type where the elements are controlled by a timer, independently of the heat load, there is a risk that a fire could be intensified if the heating elements continue to operate while an item to be toasted is burning. There is therefore a need for an improved timer-controlled toaster with anti-burn features which will mitigate the likelihood of a dangerous fire occurring. It is an object of the present invention to overcome or substantially ameliorate the above-mentioned disadvantages or more generally to provide an improved electric toaster.

DISCLOSURE OF THE INVENTION

According to one aspect of the present invention there is provided an electric toaster including:
a pair of AC power terminals;
a heating element;
a toasting carriage moveable from an ejection position against resilient means to a toasting position;
a first switching module electrically connected between the AC power terminals and the heating element for switching the current to pass through the heating element;
an electromagnet energised for latching the toasting carriage in the toasting position;
a first rectifying circuit operable for supplying DC current to energise the electromagnet, the first rectifying circuit being electrically connected to a branch from the heating element;
a timer control circuit for controlling operation of the electromagnet and release the toasting carriage;
a second rectifying circuit connected by a branch between the first switching module and the AC power terminals for supplying DC current to the control circuit, the second rectifying circuit;
a second switching module electrically connected between the heating element and the first rectifying circuit for isolating the first rectifying circuit from the heating element;
a third switching module controlled by the timer control circuit and electrically connected between the electromagnet and the first rectifying circuit, and
wherein switches of the first and second switching modules are disposed in an array near the toasting position and are closed by movement of the toasting carriage to the toasting position.

Preferably the AC power terminals are electrically connected to respective phase and neutral conductors joined by the heating element, the switches of the first switching module comprise a first switch and a second switch connected to the phase and neutral conductors respectively such that with any one of the first and second switches open the current supply to the heating element is cut; the first rectifying circuit comprises two legs and the switches of the second switching module comprise a third switch and a fourth switch, each electrically connected in one of the two legs, such that with both the third and fourth switches open the first rectifying circuit is isolated from the heating element.

Preferably the switches of the first switching module further comprise a fifth switch serially connected with the first switch to the phase conductor.

Preferably a thermal overload switch is electrically connected in series between the first and fifth switches. Preferably the thermal overload switch includes a bimetallic switching element, and does not require manual resetting after operation, and can be tripped multiple times.

Preferably an input signal line, electrically connected between the first and fifth switches, sends a signal indicative of closing of the first switch to the timer control circuit.

Preferably a latching block to which a ferrous part is fixed for cooperating with the electromagnet, the latching block being moveable between a latched position for latching the toasting carriage in the toasting position, and a released position, wherein in the toasting position the latching block abuts the first and second switches and the carriage, or a fixture on the carriage, abuts the third, fourth and fifth switches to thereby close the first, second, third, fourth and fifth switches.

In another aspect the invention provides an electric toaster comprising:
a pair of AC power terminals;
a heating element;
phase and neutral conductors electrically connecting the heating element to the AC power terminals;
a toasting carriage moveable from an ejection position against resilient means to a toasting position;
a first switch and a second switch connected to the phase and neutral conductors respectively such that with any one of the first and second switches open the current supply to the heating element is cut;
a hook disposed on the toasting carriage;
a moveably mounted latching block cooperating with the hook for latching the toasting carriage in the toasting position, the latching block being moveable between a latched position in engagement with the hook and a released position disengaged from the hook;
a ferrous part fixed to the latching block;
an electromagnet cooperating with the ferrous part to hold the latching block in its latched position thereby latching the toasting carriage in the toasting position;
a first rectifying circuit operable for supplying DC current to energise the electromagnet, the first rectifying circuit being electrically connected to a branch from the heating element and comprising a supply and return leg;
a timer control circuit for controlling operation of the electromagnet and release the toasting carriage;
a second rectifying circuit connected by a branch between the first switching module and the AC power terminals for supplying DC current to the control circuit;
a third switch and a fourth switch, each electrically connected in one of the supply and return legs of the first rectifying circuit, such that with both the third and fourth switches open the first rectifying circuit is isolated from the heating element. a switching device controlled by the timer control circuit and electrically connected between the electromagnet and the first rectifying circuit, and
wherein the first, second, third and fourth switches are each single-pole single-throw normally-open switches disposed in an array, and when the toasting carriage is lowered the carriage, or a fixture on the carriage, abuts the third and fourth fifth switches to thereby close the third, and fourth switches; and the carriage, or a fixture on the carriage, abuts the latching block which in turn abuts the first and second switches and to thereby close the first and second switches to initiate a toasting cycle.

This invention provides an electromagnetically-latched timer-released toaster which is effective and efficient in operational use, which provides a high degree of safety and reliability, with faster response time and improved stability of the electromagnetic latching, all of which contribute to greatly reducing risks associated with a fire occurring during use.

BRIEF DESCRIPTION OF THE DRAWINGS

Preferred forms of the present invention will now be described by way of example with reference to the accompanying drawings, wherein:
FIG. 3 is a perspective view of a toasting carriage of the toaster of the invention;
FIG. 4 is a perspective view of a latching block of the toaster of the invention;
FIG. 5 is a perspective view of a switch array of the toaster of the invention;
FIG. 6 is a perspective view showing the toasting carriage, latching block and switch array assembled onto the toaster of the invention.

DESCRIPTION OF THE PREFERRED EMBODIMENTS

Figure 1:
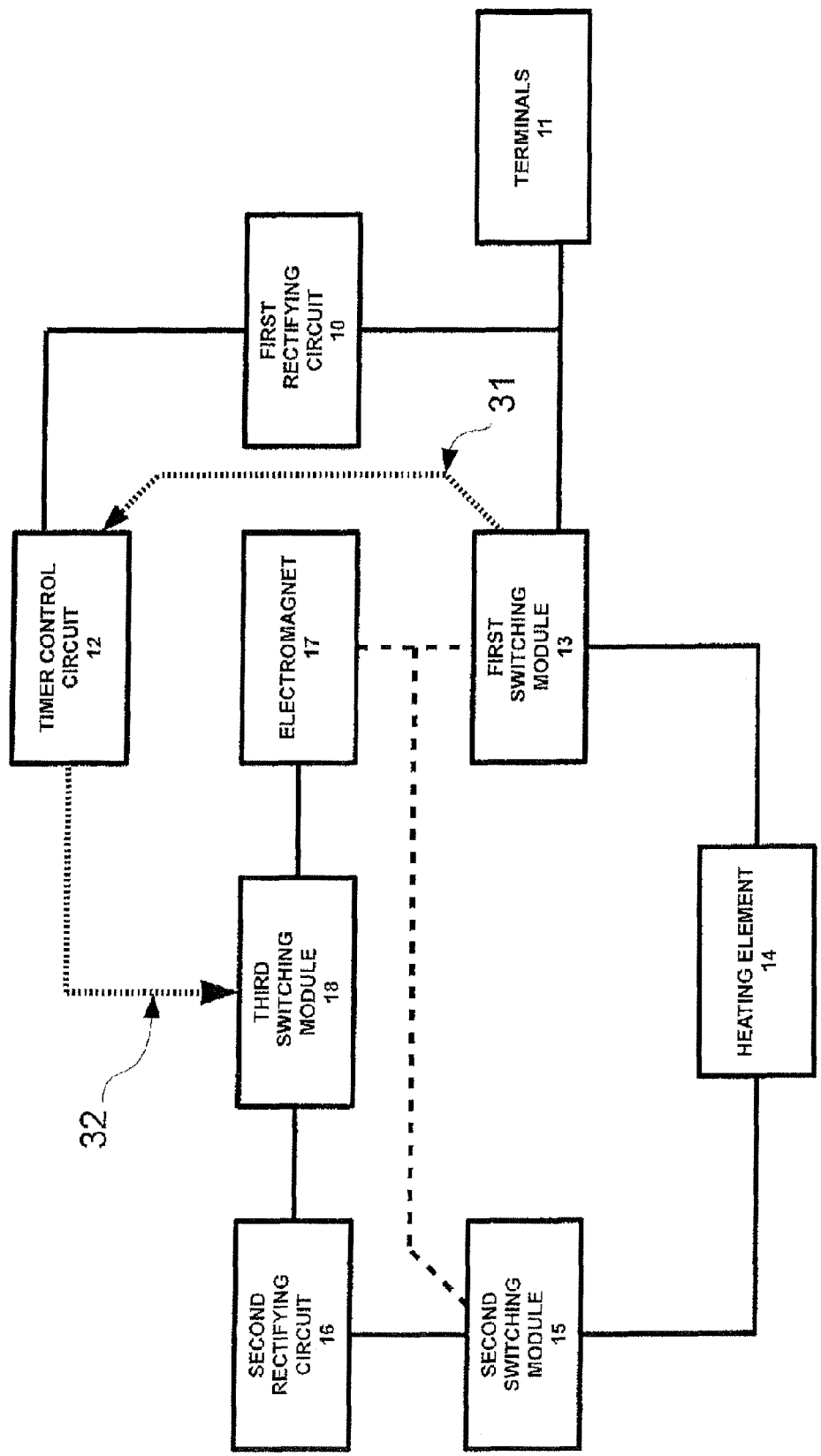
FIG. 1 is a block diagram of the circuit of the toaster of the invention.
Figure 2:
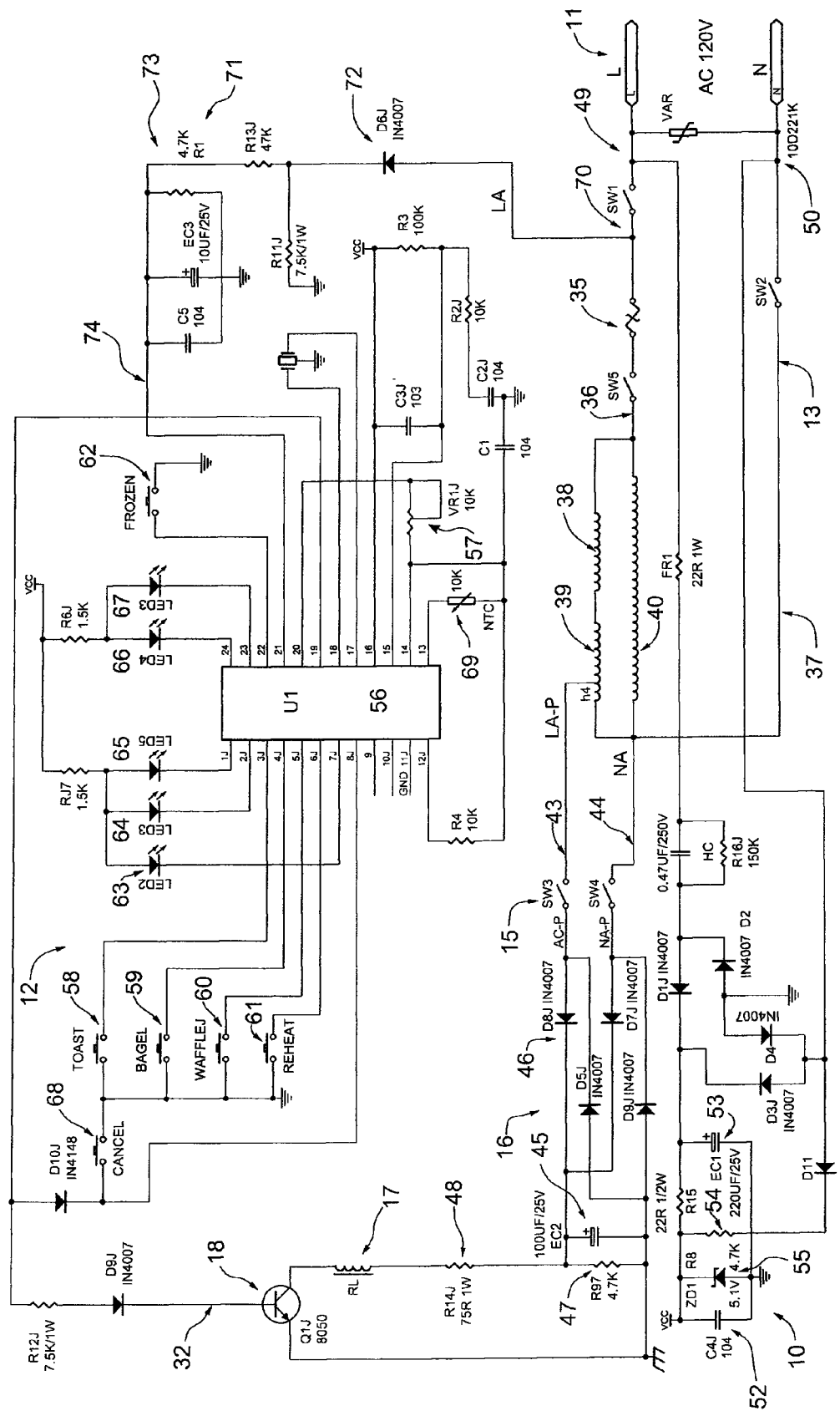
FIG. 2 is a schematic of the electrical circuit of the toaster of the invention.

Referring to FIGS. 1-4 of the drawings, the toaster 100 includes a bridge rectifying circuit 10 connected to AC power terminals 11 for supplying a low voltage DC current to a timer control circuit 12. A first switching module 13 is electrically connected between the AC power terminals 11 and a heating element 14 for switching the current to pass through the heating element. A second switching module 15 is electrically connected between the heating element 14 and a rectifying circuit 16 for supplying DC current to energise an electromagnet 17.

The toaster 100 includes a toasting carriage 20 for supporting an item to be toasted (not shown). The toasting carriage 20 is mounted to slide along an upright rail 21 fixed at one end to the chassis 22 of the toaster and at the other end to a base 26 of the toaster. The carriage 20 is moveable from a raised ejection position (shown in FIG. 2) against a return spring 23 to a lowered toasting position (not shown). The carriage 20 is held in the toasting position, by cooperation with the electromagnet 17.

In particular, the carriage 20 includes a pivotally mounted hook 24 spring-biased away from the carriage to engage with a latching block 25 mounted to the base 26. At one end the latching block 25 is mounted to pivot about a transverse axis 27, and at an opposing end the latching block 25 has an abutment surface 28. A ferrous part 29 is fixed to the latching block 25 for cooperating with the electromagnet 17. The latching block 25 is moveable between the latched position shown, for latching the toasting carriage in the toasting position, and a released position (not shown) in which the abutment surface 28 is pivoted upwardly about axis 27. When the carriage 25 is lowered to the toasting position, the hook 24 engages the latching block 25, pushing it to its latched position where it is then held by the electromagnet 17, before the hook 24 is pivoted by engagement with the inclined face 30 and then retained in a recess (not shown) in the latching block 25, thereby holding the carriage in the toasting position.

The toasting cycle is initiated by moving the toasting carriage 20 to the toasting position, and the resulting operation of the switching modules 13 and 15. As the rectifying circuit 11 and timer control circuit 12 receive current whenever the terminals 11 are connected to mains power, and as soon as a signal indicative of actuation of the switching module 13 is received along input signal line 31, the timer control circuit 12 is able to transmit a latching signal along output line 32 to the switching module 18, which is then operated to activate the electromagnet 17. As the timer control circuit 12, which preferably comprises a microprocessor 56, is always live there is no delay while it is configured and before it is able to process the input and provide the latching signal. Having a bridge rectifying circuit 16 for powering the electromagnet 17, which is separate from the rectifying circuit 10 powering the timer control circuit 12, improves reliability and responsiveness of the carriage latching. The switching module 15 serves to isolate the heating element 14 from a fault current passing from the always live timer control circuit 12, so that a user cannot unexpectedly find the element 14 to be live.

Referring to FIG. 6, the AC terminals 11 comprise terminals L and N connected to phase and neutral conductors 36 and 37 respectively. The phase and neutral conductors 36, 37 are joined by the heating elements 38-40. In a two-slice toaster the power is split between elements 38 and 39 in the outer sides of the two toasting chambers 41, 42, while the larger element 40 spans the inners sides of both toasting chambers 41, 42 In use terminals L and N are connected to the electrical mains. The switching module 13 includes three single-pole, single-throw normally-open switches, designated SW1, SW2 and SW5 that are mechanically operated in a manner described in detail below with reference to FIGS. 2-5. The switching module 13 further includes a thermal overload switch 35, such as a bimetallic thermostatic switch mounted to the chassis of the toaster and electrically connected to the phase conductor 36. The thermal overload switch 35 is set to open at a temperature above that resulting from normal operation, to respond to an event such as an item being toasted catching fire. The first switch SW1 and second switch SW2 are connected to the phase and neutral conductors 36, 37 respectively. The second switch SW2 controls power to the heating elements, should the polarity of the power supply be reversed. The fifth switch SW5 is also redundant, and is provided as an additional safeguard, such that with any one of the first, second and fifth switches SW1, SW2, SW5 open the current supply to the heating elements is cut to avoid burning.

The upper current carrying line through the heating element 38, 39 includes a voltage divider connected to a first leg 43 of the first rectifying circuit 16. The other side of the first rectifying circuit 16 is connected with the neutral conductor 37. The first rectifying circuit 16 includes a smoothing capacitor 45 across the output of the first bridge rectifier 46, and resistors 47, 48.

The switching module or switching transistor 18 is electrically connected in series with the resistor 48 and the electromagnet 20 between the positive and negative lines of the first rectifying circuit, while the emitter of the switching transistor 18 is connected to an output line 32 from the timer control circuit 12. In this manner the timer control circuit 12 actuates the switching transistor 18 for supplying current to the electromagnet coil 20.

In the phase and neutral lines between the switching module 13 and the AC terminals L, N are respective nodes 49, 50 from which upper and lower branches extend to a second diode rectifier 51 of the second rectifying circuit 10.

The second rectifying circuit 10 includes smoothing capacitors 52, 53 across the output of the second rectifier 51, as well as a resistors 54 and Zener diode 55 which provide a voltage regulator, supplying DC voltage Vcc for powering the timer control circuit 12.

The timer control circuit 12 includes a microprocessor or integrated circuit 56 of a known type, the operation of which will not be described in detail. The base of the transistor 18 is connected to an output pin of the IC 56. The principal controls and sensors in the control circuit 12 include the variable resistor 57 used as the primary means for controlling the degree of toasting by the timing of the toasting cycle. Five mode switches 58-62 are provided for further controlling the cycle (the modes including "Frozen", "Reheat", "Bagel" etc), each having an associated LED 63-67 indicating the selected status of each mode. A "cancel" switch 68 allows each mode to be de-selected. A negative temperature coefficient thermistor 69 is used to monitor temperature.

Connected to the first switching module 13 at a node 70 in the phase line between the switch SW1 and the thermal overload switch 35 is an activation-sensing circuit 71 which provides a DC signal to the integrated circuit 56 indicating that the switch SW1 has been closed. The activation-sensing circuit 71 includes diode 72 and voltage divider 73. Line 74 connects the output side of the activation-sensing circuit 71 to a pin of the IC 56.

As shown in FIGS. 2-5, the switches SW1, SW2, SW3, SW4, SW5 of the first and second switching modules 13, 15 are disposed in an array upon a circuit board 77, that is generally upright and mounted to the base 26 adjacent the toasting position of the carriage 20. The second and fifth switches SW2, SW5 are disposed adjacent one another, and opposite the abutment surface 28 of the latching block 25. As the carriage 20 is lowered a finger 78 extending downwardly from the carriage first abuts the first switch SW1, before a transversely projecting arm 79 abuts both the third and fourth switches SW3, SW4 to close them simultaneously.

FIG. 6 schematically illustrates the toasting carriage 20 of the toaster and the electromagnetic latching mechanism 75 for holding the toasting carriage 20 down in its toasting position (not shown) against the spring 23 that is urging it to its extended position. The throws of the second and fifth switches SW2, SW5 are shown schematically abutting abutment surface 28 of the latching block 25 by which they are closed, simultaneously.

In operation, when the terminals L, N are connected to the mains supply, current is supplied through the second rectifying circuit 10 for supplying current to the timer control circuit 12. To toast a slice of bread or the like, the user places the item in one of the toasting chambers 41, 42 to sit upon arms (not shown) of the toasting carriage 20 and lowers the toasting carriage 20 toward the toasting position.

When the finger 78 first abuts and closes the first switch SW1 the input signal line, electrically connected between the first switch SW1 and thermal overload switch 35, sends a signal to the activation-sensing circuit 71 which in turn provides a signal indicative of closing of the first switch to the timer control circuit 12. The timer control circuit 12 then starts a timer and transmits a latching signal along output line 32.

Figure 7:
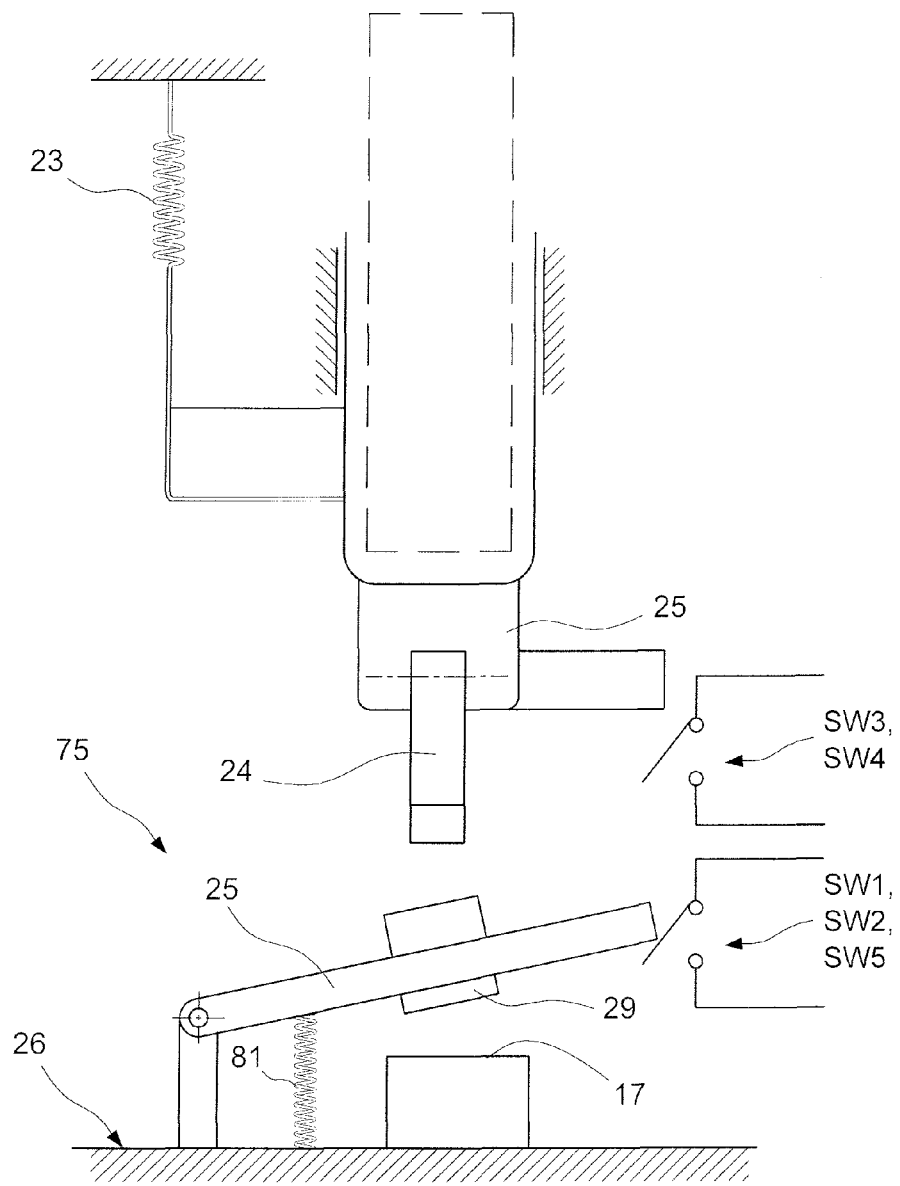
FIG. 7 is a schematic of the latching mechanism of the toaster of the present invention.

The hook 24 and latching block 25 initially abut, pivoting the latching block 25 downwardly against its release spring 81, thereby closing the second and fifth switches SW2, SW5 and substantially simultaneously the third and fourth switches SW3, SW4 are closed by abutment with the carriage. Power is thus provided to the heating elements 38-40 and to the rectifying circuit 16 for powering the electromagnet 20. With a current flowing between the collector and emitter of the switching transistor 18 and through the electromagnet 20 it attracts the ferrous block 29, the magnetic circuit holding the ferromagnetic block 56 and electromagnet coil 20 together. With the hook 24 and latching block 25 mutually engaged the toasting carriage 20 is thereby latched in the toasting position. In this manner the current drawn through the electromagnet 20 is generally independent of the current drawn by the control circuit and strong, reliable latching action is achieved. At the end of the toasting time the controller 56 stops the latching signal along output line 32 to the switching module 18, thereby opening the circuit powering the electromagnet 20 which then allows the latching block 25 to pivot to its released position (shown in FIG. 7) and thus allows switches SW2 and SW5 to open. In this manner switches SW2 and SW5 cut power to the elements 38-40, independently of the position of the toasting carriage 20, so burning is prevented in the event that the toasting carriage 20 becomes stuck in the toasting position.

Aspects of the present invention have been described by way of example only and it should be appreciated that modifications and additions may be made thereto without departing from the scope thereof.

The invention claimed is:

1. An electric toaster comprising:
a pair of AC power terminals;
a heating element;
a toasting carriage moveable from an ejection position, against resilient means, to a toasting position;
a first switching module including at least one switch and electrically connected between the AC power terminals and the heating element for switching an electrical current to flow through the heating element;
an electromagnet energised for latching the toasting carriage in the toasting position;
a first rectifying circuit for supplying a first DC current to energise the electromagnet, the first rectifying circuit being electrically connected to a branch from the heating element;
a timer control circuit for controlling operation of the electromagnet and releasing the toasting carriage from the toasting position;
a second rectifying circuit connected by a branch between the first switching module and the AC power terminals for supplying a second DC current to the timer control circuit;
a second switching module including at least one switch and electrically connected between the heating element and the first rectifying circuit for isolating the first rectifying circuit from the heating element; and
a third switching module controlled by the timer control circuit and electrically connected between the electromagnet and the first rectifying circuit, wherein the switches of the first and second switching modules are disposed in an array located near the toasting position of the toasting carriage and are closed by movement of the toasting carriage to the toasting position.

2. The electric toaster of claim 1 wherein
the AC power terminals are electrically connected to respective phase and neutral conductors electrically joined by the heating element,
the at least one switch of the first switching module comprises a first switch and a second switch connected to the phase and neutral conductors, respectively, such that, with any one of the first and second switches electrically open, flow of the electrical current to the heating element is stopped, and
the first rectifying circuit comprises two legs and the at least one switch of the second switching module comprises a third switch and a fourth switch, each of the third and fourth switches being electrically connected in a respective one of the two legs, such that, with both of the third and fourth switches electrically open, the first rectifying circuit is isolated from the heating element.

3. The electric toaster of claim 2 wherein the first switching module further comprises a fifth switch serially connected, with the first switch, to the phase conductor.

4. The electric toaster of claim 3 further including a thermal overload switch electrically connected in series between the first and fifth switches.

5. The electric toaster of claim 3 including an input signal line, electrically connected between the first and fifth switches, wherein the input signal line sends a signal indicative of closing of the first switch to the timer control circuit.

6. The electric toaster of claim 3 further comprising a latching block to which a ferrous part is fixed for cooperating with the electromagnet, the latching block being moveable between a latched position, latching the toasting carriage in the toasting position, and a released position, wherein, in the toasting position, the latching block abuts the first and second switches and the carriage, or a fixture on the carriage, abuts the third, fourth, and fifth switches closing the first, second, third, fourth, and fifth switches.

7. An electric toaster comprising:
a pair of AC power terminals;
a heating element;
phase and neutral conductors electrically connecting the heating element to the AC power terminals;
a toasting carriage moveable from an ejection position, against resilient means, to a toasting position;
a first switch and a second switch connected to the phase and neutral conductors, respectively, such that with any one of the first and second switches open, current flow to the heating element is stopped;
a hook disposed on the toasting carriage;
a moveably mounted latching block cooperating with the hook for latching the toasting carriage in the toasting position, the latching block being moveable between a latched position, in engagement with the hook, and a released position, disengaged from the hook;
a ferrous part fixed to the latching block;
an electromagnet cooperating with the ferrous part to hold the latching block in the latched position, latching the toasting carriage in the toasting position;
a first rectifying circuit for supplying a first DC current to energise the electromagnet, the first rectifying circuit being electrically connected to a branch from the heating element and comprising a supply leg and a return leg;
a timer control circuit for controlling operation of the electromagnet and releasing the toasting carriage from the toasting position;
a second rectifying circuit connected by a branch between the first switching module and the AC power terminals for supplying a second DC current to the timer control circuit;
a third switch and a fourth switch, each of the third and fourth switches being electrically connected in a respective one of the supply and return legs of the first rectifying circuit, such that with both the third and fourth switches open, the first rectifying circuit is isolated from the heating element; and
a switching device controlled by the timer control circuit and electrically connected between the electromagnet and the first rectifying circuit, wherein
the first, second, third, and fourth switches are each single-pole single throw normally-open switches disposed in an array, and,
when the toasting carriage is lowered, the carriage, or a fixture on the carriage, abuts the third and fourth switches, closing the third fourth switches, and the carriage, or a fixture on the carriage, abuts the latching block which, in turn, abuts the first and second switches and closes the first and second switches to initiate a toasting cycle.

8. The electric toaster of claim 7 further comprising:
a fifth switch serially connected with the first switch to the phase conductor;
an input signal line electrically connected between the first and fifth switches for sending a signal indicative of closing of the first switch to the timer control circuit; and a thermal overload switch electrically connected in series between the first and fifth switches, wherein the fifth switch is mounted in the array and is abutted by the carriage, or a fixture on the carriage, closing the fifth switch substantially simultaneously with closing of the third and fourth switches.

9. The electric toaster of claim 8 further comprising a base, wherein the latching block is pivotably mounted to the base.

10. The electric toaster of claim 9 including a circuit board, wherein the first, second, third, fourth, and fifth switches are mounted on the circuit board, and the circuit board extends upwardly from the base.

11. The electric toaster of claim 7 wherein the hook is pivotally mounted to the toasting carriage.

12. The electric toaster of claim 11 wherein the hook is spring biased away from the carriage.

13. The electric toaster of claim 7 wherein the latching block is spring biased away from the electromagnet.

* * * * *